United States Patent
Poncelet et al.

(10) Patent No.: US 8,900,476 B2
(45) Date of Patent: Dec. 2, 2014

(54) COLLOIDAL DISPERSION OF ALUMINUM OXIDE

(75) Inventors: Olivier Poncelet, Grenoble (FR); Lionel Bonneau, Cran Gevrier (FR); Daniel Getto, Le Fontanil (FR); Francois Tardif, Lans en Vercors (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 58 days.

(21) Appl. No.: 13/513,642

(22) PCT Filed: Nov. 30, 2010

(86) PCT No.: PCT/FR2010/000796
§ 371 (c)(1),
(2), (4) Date: Nov. 13, 2012

(87) PCT Pub. No.: WO2011/067482
PCT Pub. Date: Jun. 9, 2011

(65) Prior Publication Data
US 2013/0056675 A1    Mar. 7, 2013

(30) Foreign Application Priority Data
Dec. 3, 2009 (FR) .................................... 09 05838

(51) Int. Cl.
| C09K 5/00 | (2006.01) |
| C09K 5/10 | (2006.01) |
| G21C 15/28 | (2006.01) |
| C01F 7/02 | (2006.01) |
| B82Y 30/00 | (2011.01) |

(52) U.S. Cl.
CPC ............... *C09K 5/10* (2013.01); *C01P 2006/32* (2013.01); *Y02E 30/40* (2013.01); *C01P 2004/62* (2013.01); *C01P 2006/22* (2013.01); *G21C 15/28* (2013.01); *C01F 7/02* (2013.01); *C01P 2004/64* (2013.01); *B82Y 30/00* (2013.01)
USPC .................................. 252/73; 252/74; 252/75

(58) Field of Classification Search
None
See application file for complete search history.

(56) References Cited

U.S. PATENT DOCUMENTS
2008/0212733 A1 * 9/2008 Pop et al. ...................... 376/282

OTHER PUBLICATIONS

International Search Report and Written Opinion for PCT/FR2010/000796, dated Mar. 22, 2011.
Timofeeva et al. In "Particle shape effects on thermophysical properties of alumina nanofluids", Journal of Applied Physics, vol. 106, No. 1, p. 14304 (Jul. 2009).
Yu et al., "Review and Comparison of Nanofluid Thermal Conductivity and Heat Transfer Enhancements", Heat Transfer Engineering, vol. 29, No. 5, pp. 432-460 (May 2008).
Vasu et al., "Thermal design analysis of compact heat exchanger using nanofluids", International Journal of Nanomanufacturing, vol. 2, No. 3, pp. 271-288 (Jan. 2008).

* cited by examiner

*Primary Examiner* — Necholus Ogden, Jr.
(74) *Attorney, Agent, or Firm* — Lowe Hauptman & Ham, LLP

(57) ABSTRACT

The invention relates to a heat-transporting fluid and to the use thereof. The heat-transporting fluid of the invention is formed of an aqueous colloidal sol including water and up to 58.8 wt %, relative to the total fluid weight, in a-Al2O3 particles, the thickness of which is the smallest dimension and less than or equal to 30 nm 90% to 95% of said a-Al2O3 particles have a size less than or equal to 210 nm, among which 50% have a size less than or equal to 160 nm. The invention is of use in the field of cooling, in particular nuclear reactor backup cooling.

8 Claims, 1 Drawing Sheet

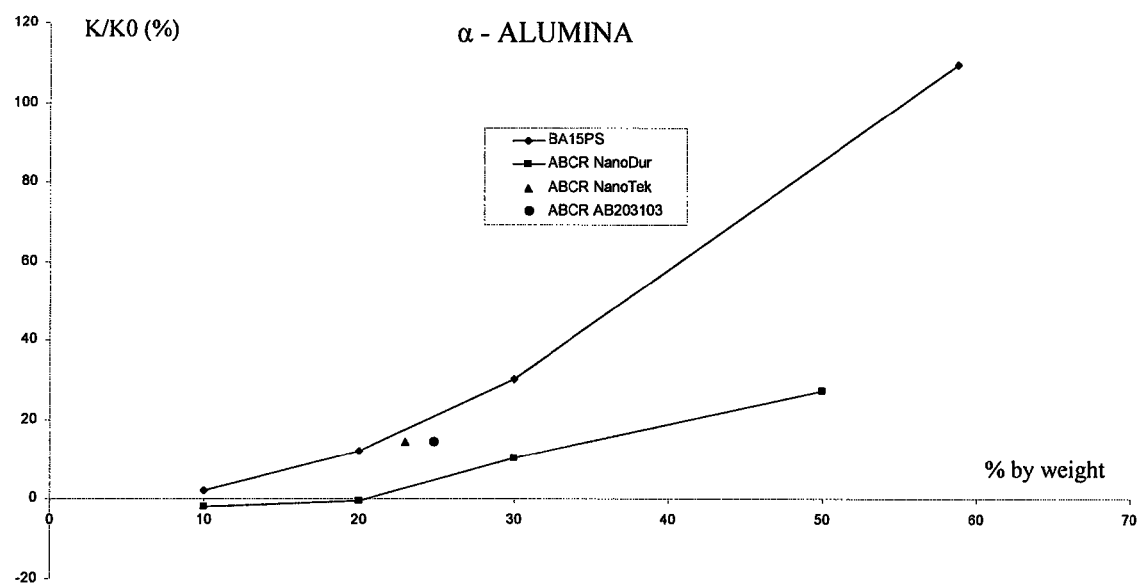

COLLOIDAL DISPERSION OF ALUMINUM OXIDE

RELATED APPLICATIONS

The present application is a National Phase of International Application Number PCT/FR2010/000796, filed Nov. 30, 2010, and claims priority from French Application Number 09 05838, filed Dec. 3, 2009.

BACKGROUND

The invention relates to a heat-exchange fluid and to its use.

Heat-exchange fluids are intended to cool numerous devices subjected to temperatures which are considered to be too high for the satisfactory operation of the device.

For example, they are used for the cooling of micro-processors, onboard electronics, or heat or electric engines.

They are also used in the cooling of nuclear reactors.

Water is one of the best fluids known as heat-exchange fluid.

However, additives, such as ethylene glycol or propylene glycol, may be added to it, which additives prevent it from freezing at excessively low temperatures.

However, wherever savings in weight are expected, the fact of being able to use a smaller amount of heat-exchange fluid (water, water+ethylene glycol) for identical, indeed even superior, heat-exchange properties is of great advantage.

Thus, it is necessary to increase the thermal conductivity of the heat-exchange fluid. It has been recently demonstrated that the addition of nanoparticles to a heat-exchange fluid significantly increases the thermal conductivity of the heat-exchange fluid. These novel heat-exchange fluids take the name of nanofluids (Choi (S.)—Enhancing Thermal Conductivity of Fluids with Nanoparticles.—The American Society of Mechanical Engineers, New York, Vol. 231/MD—Vol. 66: 99-105, November 1995, or Yu (W.), France (D.), Routbort (J.) and Choi (S.), Review and Comparison of Nanofluid Thermal Conductivity and Heat Transfer Enhancements.—Heat Transfer Engineering, Vol. 29, pp. 432-460 (2008), or Das (S.), Choi (S.), Yu (W.) and Pradeep (T.)—Nanofluids: Science and Technology.—J. Wiley (2008)).

The addition of various types of nanoparticles to a fluid in order to enhance the thermal properties thereof has been widely studied and it currently appears that it is not necessary for the nanoparticles used to be, by nature, composed of a good heat-conducting material, such as a metal, and that respectable performances can be obtained with materials which are thermally markedly less effective, such as clays or oxides: halloysite, laponite, silica ($SiO_2$), zinc oxide (ZnO) or alumina ($Al_2O_3$), these materials being products which are available industrially. Parameters such as the robustness, that is to say the stability over time of the nanofluid in use, and the overall energy balance, that is to say the compromise between the increase in the thermal conductivity with respect to the increase in the viscosity of the fluid, can be evaluated.

By way of comparison, in laminar flow, the overall energy balance is considered to be positive when the increase in viscosity is less than 5 times the increase in the thermal conductivity.

This is because an excessively great increase in viscosity results in the need to increase the power of the pumping unit, which has the effect of nullifying all, or a large part, of the benefit obtained by the increase in thermal conductivity.

More particularly, alumina $\gamma$-$Al_2O_3$ and $\alpha$-$Al_2O_3$ and its hydrated derivatives ($Al(OH)_3$, AlOOH), as regards their industrial availability, their very low toxicity and the possibility of obtaining nanoparticles having numerous shapes, has been more particularly studied and its thermal conductivity is good for a material of oxide type (40 $m^{-1}K^{-1}$, for $\alpha$-$Al_2O_3$).

For the hydrated forms of alumina, this thermal conductivity is much lower.

The influence of the shape and size of the alumina particles on the improvement in the thermal conductivity of water has been studied in particular by Timofeeva et al. in "*Particle shape effects on thermophysical properties of alumina nanofluids*", Journal of Applied Physics, 106, 014304 (2009).

The conclusions of this paper are that alumina particles in the platelet form result in the lowest increase in the thermal conductivity of the heat-exchange fluid in which the alumina is incorporated, in comparison with alumina in the strip, slab or cylindrical form, and that, furthermore, the alumina in the platelet form is the alumina which brings about the greatest increase in the viscosity of the heat-exchange fluid in which it is incorporated, still in comparison with chemically equivalent aluminas having the strip, slab or cylindrical form.

Thus, among the alumina nanoparticles which can be used as additive in a heat-exchange fluid, those having a platelet form, that is to say whose smallest dimension is the thickness, are those which are the least suitable as, at an equivalent percentage by weight in the heat-exchange fluid, it is these which exhibit the weakest ability to increase the thermal conductivity of the fluid but which, on the other hand, greatly increase the viscosity thereof.

SUMMARY

In point of fact, going against this state of the art, the invention provides a heat-exchange fluid comprising such alumina particles in the form of platelets.

Thus, the invention provides a heat-exchange fluid, characterized in that it is composed of an aqueous colloidal sol comprising:
1) water, and
2) up to 58.8% by weight, with respect to the total weight of the fluid, of particles of $\alpha$-$Al_2O_3$:
   the thickness of which is the smallest dimension and is less than or equal to 30 nm, preferably between 15 and 25 nm,
   for which from 90 to 95% by number of these particles have a size of less than or equal to 210 nm, among which 50% by number have a size of less than or equal to 160 nm.

In addition, preferably, 10% by number, of these 90 to 95% by number of particles, have a size of less than or 130 nm.

Preferably, the fluid of the invention has a viscosity of less than 10 cP, more preferably of less than 5 cP, while being greater than 1.1 cP.

Preferably, the fluid of the invention comprises solely said $\alpha$-$Al_2O_3$ particles and water.

In this case, preferably, the fluid has a density of between 1.650 and 1.770, more preferably of 1.748.

The heat-exchange fluid of the invention is particularly appropriate as fluid for the emergency cooling of nuclear reactors.

BRIEF DESCRIPTION OF THE DRAWING

A better understanding of the invention will be obtained and other characteristics and advantages of the invention will become more clearly apparent on reading the explanatory description which follows and which is given with reference to FIG. 1, which shows the curves for increase in the thermal conductivity K (with respect to $K_0$, the thermal conductivity of pure water) of various heat-exchange fluids comprising α-alumina particles of different shapes, as a function of the concentration by weight of these alumina particles in the aqueous sol.

DETAILED DESCRIPTION

The invention is based on the discovery that a heat-exchange fluid comprising water and α-alumina (α-Al$_2$O$_3$) particles having the form of platelets and having a very precise distribution in the size of the particles has superior properties of improving the thermal conductivity than any other form of alumina particles and of size distribution.

The size of the particles is measured by differential light scattering (dls).

Thus, the alumina particles used in the invention are particles in the form of platelets, that is to say have the form of flat particles, the thickness of which is the smallest dimension and is less than or equal to 30 nm, preferably between 15 and 25 nm, and which have a precise size distribution:

from 90 to 95% by number of the particles have a size of less than or equal to 210 nm, 50% by number of these 90 to 95% of particles have a size of less than or equal to 160 nm. Preferably, in addition, 10% by number of these 90 to 95% of particles have a size of less than or equal to 130 nm.

In addition to this specific particle size distribution, the nanoparticles used in the invention have a size of between 300 and 60 nm.

Size is understood to mean the greatest dimension of these nanoparticles and typically their mean diameter. This size is measured by transmission microscopy.

Such a heat-exchange fluid is easily produced by mixing the alumina nanoparticles in water, according to tech-niques known to a person skilled in the art.

As is seen in FIG. 1, which represents the increase in the thermal conductivity K of a fluid composed of water and of alumina particles, with respect to the thermal conductivity K$_0$ of water alone, as a function of the concentration by weight of nanoparticles of colloidal dispersions of alumina oxide of different forms, at all the concentrations, it is the colloidal dispersion of alumina denoted BA15PS®, sold by Baikowski, which shows the best increase in conductivity. In particular, at a concentration of 50% by weight of alumina, with respect to the total weight of the heat-exchange fluid composed of water and alumina, for the colloidal dispersion of BA15PS® alumina nanoparticles, an increase in the thermal conductivity of 86% is obtained, whereas, for the same concentration by weight, the colloidal dispersion of nanoparticles of NanoDur® X1121W alumina, sold by Alfa Aesar, shows only an increase in thermal conductivity of 25%.

The colloidal dispersions of NanoDur® X1121W and NanoTek® Al-6021 aluminas sold by Alfa Aesar show an increase in the asymptotic thermal conductivity from a concentration by weight of 20%.

The alumina nanoparticles participating in the composition of these aqueous colloidal sols are all crystalline α-aluminas.

They exhibit different morphologies.

They do not comprise undesirable phases (mainly AlOOH and γ-Al$_2$O$_3$).

The size domains are comparable but BA15PS® alumina is less polydisperse in sizes.

The morphology of the colloidal dispersions of NanoDur® X1121W and NanoTek® Al-6021 aluminas is spherical, whereas the BA15PS® alumina is, for its part, a crystalline α-alumina not comprising undesirable phases, in the form of platelets for which the size distribution is such that from 90 to 95% of the nanoparticles exhibit a size of less than or equal to 210 nm and that, among from 90 to 95% of nanoparticles, 50% have a size of less than or equal to 160 nm and only 10% of these 90 to 95% of nanoparticles have a size of less than or equal to 130 nm.

Furthermore, the viscosity of the heat-exchange fluid is increased to the least extent with this type of alumina, as is shown in the following table.

| Sample | Viscosity (cP) |
|---|---|
| Aqueous colloidal sol BA15PS ® comprising 58.8% by weight of alumina | 4.0 |
| Aqueous colloidal sol NanoDur ® X1121W comprising 53.3% by weight of alumina | 40.1 |

The measurements were carried out on a Brookfield viscometer; the water measured as reference at 25° C. gave a value of 1.05 cP instead of the theoretical 1 cP.

Thus, a concentration of up to 58.8% by weight of α-alumina nanoparticles, as defined in the invention, may be added to the heat-exchange fluid.

At these concentrations, the heat-exchange fluid remains a stable aqueous colloidal sol, that is to say that no phenomenon of separation by settling is observed.

A person skilled in the art can, of course, dilute this colloidal sol, if need be, as a function of the level of thermal conductivity desired and which can be deter-mined by virtue of the curve of FIG. 1.

The alumina nanoparticles used in the invention have to have the form of platelets and can exhibit very different shapes, V shape, Y shape or even X shape.

In order to give an even better definition of the alumina used in the invention, it will be added that these alumina particles are 100% composed of α-alumina having a melting point of 2045° C., a boiling point of 2980° C. and a density of 3.965, which means that the best heat-exchange fluid according to the invention, which comprises 58.8% by weight, with respect to the total weight of the heat-exchange fluid, of such aluminas, has a density, when the heat-exchange fluid is water, which has to be between 1.650 and 1.760. Most preferably, the density is 1.748.

The excellent thermal performance of the heat-exchange fluid of the invention has, however, a converse: the fluids are highly abrasive.

Consequently, they are most preferably to be used in cooling circuits which are not intended to have a long lifetime.

Among these circuits, the emergency cooling circuit of nuclear reactors is particularly appropriate.

This is because, in the emergency cooling circuit of nuclear reactors, it is a question of being able to very quickly cool the core of the reactor in the event of accidental overheating.

Thus, in this application, where there will be no question of restarting the power plant, the abrasive nature of the heat-exchange fluid of the invention is not important as what counts is its ability to disperse the most heat possible with the least material possible.

The aim of the heat-exchange fluid of the invention is to prevent the fuel rods from melting and radioactive material from being scattered.

The heat-exchange fluid of the invention is thus perfectly appropriate for this type of use.

The invention claimed is:

1. A heat-exchange fluid, characterized in that it is composed of an aqueous colloidal sol comprising:
   1) water, and
   2) from 20 to 58.8% by weight, with respect to the total weight of the fluid, of particles of $\alpha$-$Al_2O_3$:
      said particles of $\alpha$-$Al_2O_3$ having a thickness, which is the smallest dimension of said particles, less than or equal to 30 nm, and
      90 to 95% by number of these particles of $\alpha$-$Al_2O_3$ have a size of less than or equal to 210 nm, among which 50% by number have a size of less than or equal to 160 nm.

2. The fluid as claimed in claim 1, wherein, in addition, 10% by number of the 90 to 95% by number of particles having a size of less than or equal to 210 nm have a size of less than or equal to 130 nm.

3. The fluid as claimed in claim 1, wherein the heat-exchange fluid comprises solely said $\alpha$-$Al_2O_3$ particles and water.

4. The fluid as claimed in claim 1, wherein the heat-exchange fluid has a density of between 1.650 and 1.770.

5. The fluid as claimed in claim 1, wherein the heat-exchange fluid has a density equal to 1.748.

6. The fluid as claimed in claim 1, wherein the heat-exchange fluid has a viscosity of less than 10 cP.

7. The use of the heat-exchange fluid as claimed in claim 1 for the emergency cooling of nuclear reactors.

8. The fluid as claimed in claim 1, wherein the heat exchange fluid has a viscosity of less than 5 cP.

* * * * *